United States Patent
Herron et al.

(10) Patent No.: US 7,891,938 B2
(45) Date of Patent: Feb. 22, 2011

(54) MULTI SENSOR CLEARANCE PROBE

(75) Inventors: William Lee Herron, Springdale, OH (US); Robert Joseph Albers, Park Hills, KY (US); Rafael Jose Ruiz, Liberty Township, OH (US); Samhita Dasgupta, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 830 days.

(21) Appl. No.: 11/688,354

(22) Filed: Mar. 20, 2007

(65) Prior Publication Data

US 2009/0064522 A1   Mar. 12, 2009

(51) Int. Cl.
F01B 25/26  (2006.01)
(52) U.S. Cl. .................. 415/1; 415/118; 415/173.2
(58) Field of Classification Search .................. 415/1, 415/115, 118, 173.1, 173.2; 416/92
See application file for complete search history.

(56) References Cited

U.S. PATENT DOCUMENTS

| | | | |
|---|---|---|---|
| 4,063,167 A * | 12/1977 | Duly | 324/671 |
| 4,326,804 A | 4/1982 | Mossey | |
| 4,357,104 A | 11/1982 | Davinson | |
| 4,632,635 A | 12/1986 | Thoman et al. | |
| 4,842,477 A * | 6/1989 | Stowell | 415/118 |
| 4,999,991 A * | 3/1991 | Haddad et al. | 60/782 |
| 5,081,830 A | 1/1992 | Schwarz et al. | |
| 5,101,165 A | 3/1992 | Rickards | |
| 5,140,494 A * | 8/1992 | Slade | 361/212 |
| 5,739,524 A | 4/1998 | Fally | |
| 5,818,242 A * | 10/1998 | Grzybowski et al. | 324/642 |
| 6,152,685 A * | 11/2000 | Hagi | 415/14 |
| 6,487,491 B1 * | 11/2002 | Karpman et al. | 701/100 |
| 6,717,418 B2 * | 4/2004 | Orenstein | 324/644 |
| 6,949,922 B2 | 9/2005 | Twerdochlib et al. | |
| 7,079,957 B2 | 7/2006 | Finnigan et al. | |
| 7,431,557 B2 * | 10/2008 | Herron et al. | 415/1 |
| 7,722,310 B2 * | 5/2010 | Balasubramaniam et al. | 415/14 |

(Continued)

FOREIGN PATENT DOCUMENTS

EP   0806680 A2   11/1997

(Continued)

OTHER PUBLICATIONS

EP08152789, European Search Report, Jun. 13, 2008, 6 pages.

*Primary Examiner*—Edward Look
*Assistant Examiner*—Aaron R Eastman
(74) *Attorney, Agent, or Firm*—William Scott Andes; Steven J. Rosen (57) ABSTRACT

A multi sensor clearance probe with at least longitudinally and transversely spaced apart first and second sensors operable to measure first and second distances respectively between the sensors and a longitudinally spaced apart rotating rotor. The sensors being operable to measure blade tip clearances between radially outer turbine blade tips and an annular stator shroud circumscribing the blade tips. The blade tips may be squealer tips and the sensors operable to measure the distances between the sensors and tops of squealer tip walls and outwardly facing walls within cavities of the squealer tips. The probe may be operably connected to a controller for sending signals to the controller indicating the first and second distances for controlling an air valve used for active clearance control. Two or more of the probe may be used to determine rotor centerline offset.

36 Claims, 9 Drawing Sheets

U.S. PATENT DOCUMENTS

| | | | |
|---|---|---|---|
| 2003/0215323 A1* | 11/2003 | Prinz et al. | 415/14 |
| 2005/0196277 A1* | 9/2005 | Wang et al. | 416/92 |
| 2005/0286995 A1* | 12/2005 | Shang et al. | 415/1 |
| 2006/0002789 A1* | 1/2006 | Haffner et al. | 415/118 |
| 2006/0132147 A1* | 6/2006 | Balasubramaniam et al. | 324/662 |
| 2007/0276578 A1* | 11/2007 | Herron et al. | 701/100 |

FOREIGN PATENT DOCUMENTS

| | | |
|---|---|---|
| EP | 1314957 A2 | 5/2003 |
| EP | 1676978 A2 | 5/2006 |
| GB | 2199664 A | 7/1988 |

* cited by examiner

MULTI SENSOR CLEARANCE PROBE

BACKGROUND OF THE INVENTION

Field of the Invention

This invention relates to clearance probes used to measure tip clearances between rotors and stators and, more particularly, to such probes and methods using such probes for measuring blade tip clearances in gas turbine engines and for use in active clearance control systems.

Engine performance parameters such as thrust, specific fuel consumption (SFC), and exhaust gas temperature (EGT) margin are strongly dependent upon clearances between turbine blade tips and static seals or shrouds surrounding the blade tips. The clearances between the turbine blade tips and static seals or shrouds should be minimized while avoiding rubs between the turbine blade tips and static seals or shrouds. These clearances are affected by the different amounts and rates of thermal and mechanical growth of the rotor and stator components. Mechanical growths are due to centrifugal force which occur as speeds and pressures change. Blade and rotor growth is typically much greater than is that of the stator. Thermal growth of the stator is generally greater than that of the rotor, and it occurs much more quickly. Blade thermal growth is quickest of the three. It is highly desirable to match these different growths while maintaining as tight a clearance as is practical throughout the transient and steady state operation of the engine.

Active clearance control, one method to match these different growths, is a well known method to modulate a flow of cool or relatively hot air from the engine fan and/or compressor and spray it on high and low pressure turbine casings to shrink the casings relative to the high and low pressure turbine blade tips under steady state, high altitude cruise conditions. The air may be flowed to or sprayed on other static structures used to support the shrouds or seals around the blade tips such as flanges or pseudo-flanges.

It is highly desirable to be able to closely and accurately measure and monitor clearances between rotating blade tips and shrouds which surround them. Probes and methods using these probes have been developed to measure the blade tip clearance in order to minimize the amount of thermal control air used and to prevent rubs between the blade tips and the shrouds to improve engine wear and blade life. It is known to use probes to determine blade tip clearances and it is desirable that these probes be more accurate.

SUMMARY OF THE INVENTION

At least one multi sensor clearance probe having longitudinally and transversely spaced apart first and second sensors operable to measure first and second distances respectively between the sensors and a rotating rotor longitudinally spaced apart from the sensors. The probe may be used to measure the first and second distances respectively between the sensors and radially outer blade tips of turbine blades mounted at a periphery of the rotor to determine clearances between the blade tips and an annular stator shroud circumscribing the blade tips.

The blade tip may be a squealer tip having a squealer tip wall extending radially outwardly from and peripherally around a radially outwardly facing wall forming a squealer tip cavity therein. The first and second sensors are operable to measure the first and second distances respectively between the sensors and a top of the squealer tip wall of the blade tips. The first and second sensors may be further operable to measure the first and second distances respectively between the sensors and the radially outwardly facing wall.

An air valve to control thermal control air that is used to adjust a clearance between the blade tip and the stator shroud is operably connected to a controller which modulates and opens and closes the air valve. The first and second sensors are operably connected to the controller through a signal processor for sending signals to the controller indicating the first distance to help the controller modulate and open and close the air valve. The signal processor uses a signal indicating the second distance to calibrate the first sensor's measurement of the first distance which is sent to the controller.

At least first and second angularly spaced apart multi sensor clearance probes include at least first and second sensors in each of the clearance probes. The first and second sensors are longitudinally and transversely spaced apart and operable to measure first and second distances respectively between the sensors and a rotating rotor longitudinally spaced apart from the sensors. Turbine blades mounted at a periphery of the rotor have radially outer blade tips and an annular stator shroud circumscribes the blade tips. The first and second sensors are operable to measure the first and second distances between the sensors and the radially outer blade tips.

A method includes determining the clearance between a rotating rotor and a stator shroud circumscribing the rotor using at least one multi sensor clearance probe having at least longitudinally and transversely spaced apart first and second sensors to measure at least first and second distances respectively between the first and second sensors and a rotating rotor. The method may include measuring the first and second distances between the sensors and radially outer blade tips of turbine blades mounted at a periphery of the rotor and determining changes in height of the blade tips at least partially based on the first and second distances. Rubbing may be determined from changes in the height of the blade tips.

Another embodiment of the method includes adjusting thermal control air at least partially based on the first and second distances and using the thermal control air in an active clearance control system for controlling turbine blade tip clearances between the blade tips and an annular stator shroud circumscribing the blade tips of the turbine blades. The adjusting may be further based on a desired blade tip clearance and further include comparing a measured tip clearance at least partially based on the first and second distances to the desired blade tip clearance. The adjusting may also be further based on a calculated instantaneous blade tip clearance and comparing the measured tip clearance and/or the calculated instantaneous blade tip clearance to the desired blade tip clearance.

The calculated instantaneous blade tip clearance may be based on a first set of engine operating parameters and the desired blade tip clearance may be based on a second set of engine operating parameters. The first set of engine operating parameters may be chosen from a first group including rotor and stator time constants, measured core rotor speed, air flows, temperatures and pressures, time since throttle movement, and altitude. The second set of engine operating parameters may be chosen from a second group including measured core rotor speed, total air temperature at ambient conditions, and the altitude.

Yet another embodiment of the method determines a rotor centerline offset based on the first and second distances.

The blade tips may be squealer tips having squealer tip walls extending radially outwardly from and peripherally around radially outwardly facing walls forming squealer tip cavities therein and the measuring includes measuring the first and second distances between the sensors and tops of the squealer tip walls. The first and second distances are also measured between the sensors and the radially outwardly facing wall.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
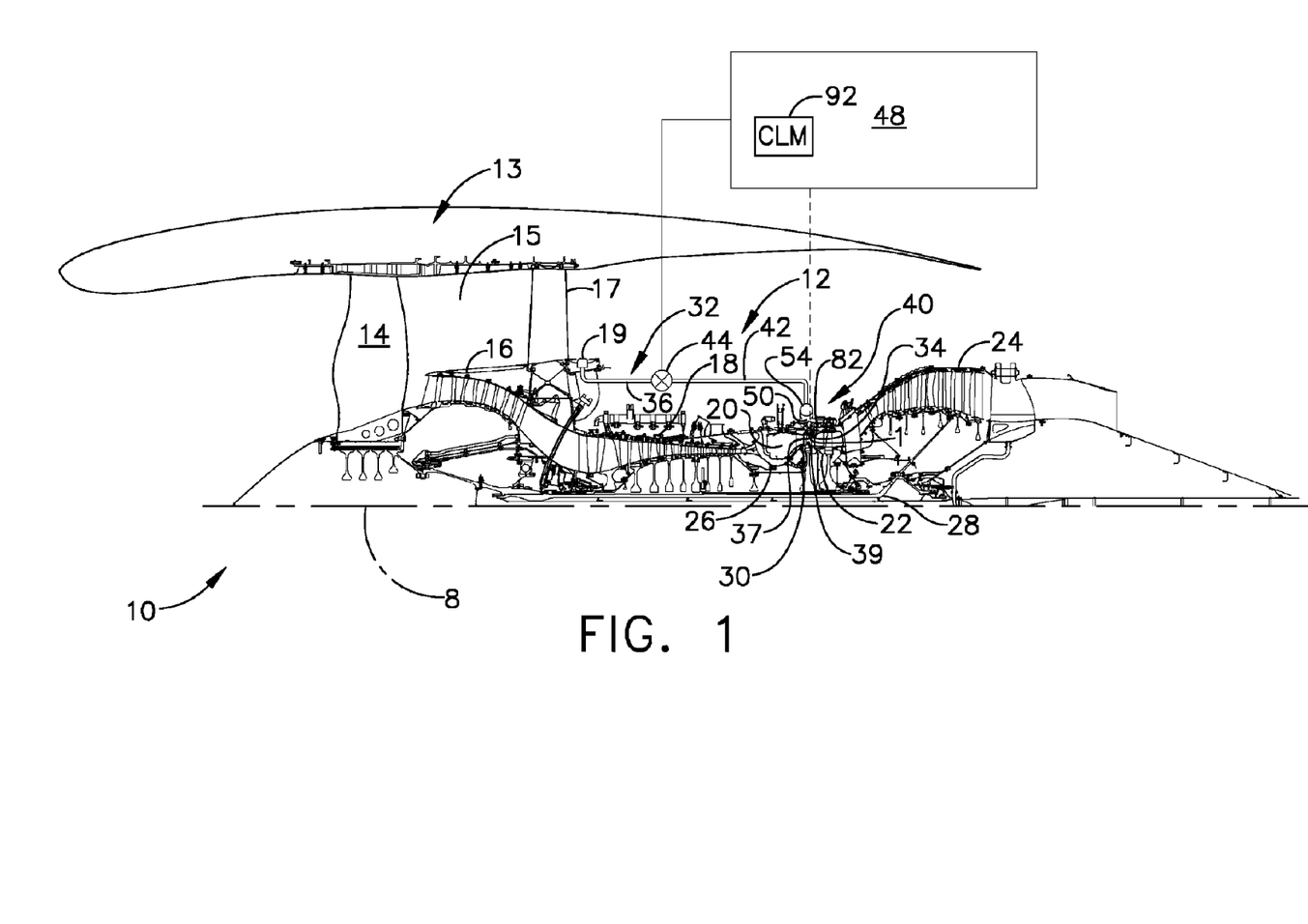
FIG. 1 is a cross-sectional view illustration of an aircraft gas turbine engine with an active clearance control system using a multi sensor blade tip clearance probe.

Schematically illustrated in cross-section in FIG. 1 is an exemplary embodiment of an aircraft gas turbine engine 10 including an active clearance control system 12. The engine 10 has, in downstream serial flow relationship, a fan section 13 including a fan 14, a booster or low pressure compressor (LPC) 16, a high pressure compressor (HPC) 18, a combustion section 20, a high pressure turbine (HPT) 22, and a low pressure turbine (LPT) 24. A high pressure shaft 26 disposed about an engine axis 8 drivingly connects the HPT 22 to the HPC 18 and a low pressure shaft 28 drivingly connects the LPT 24 to the LPC 16 and the fan 14. The HPT 22 includes an HPT rotor 30 having turbine blades 34 mounted at a periphery of the rotor 30. The blades 34 includes airfoils 37 extending radially outwardly from blade platforms 39 to radially outer blade tips 82 of the blades 34 and airfoils 37.

Figure 2:
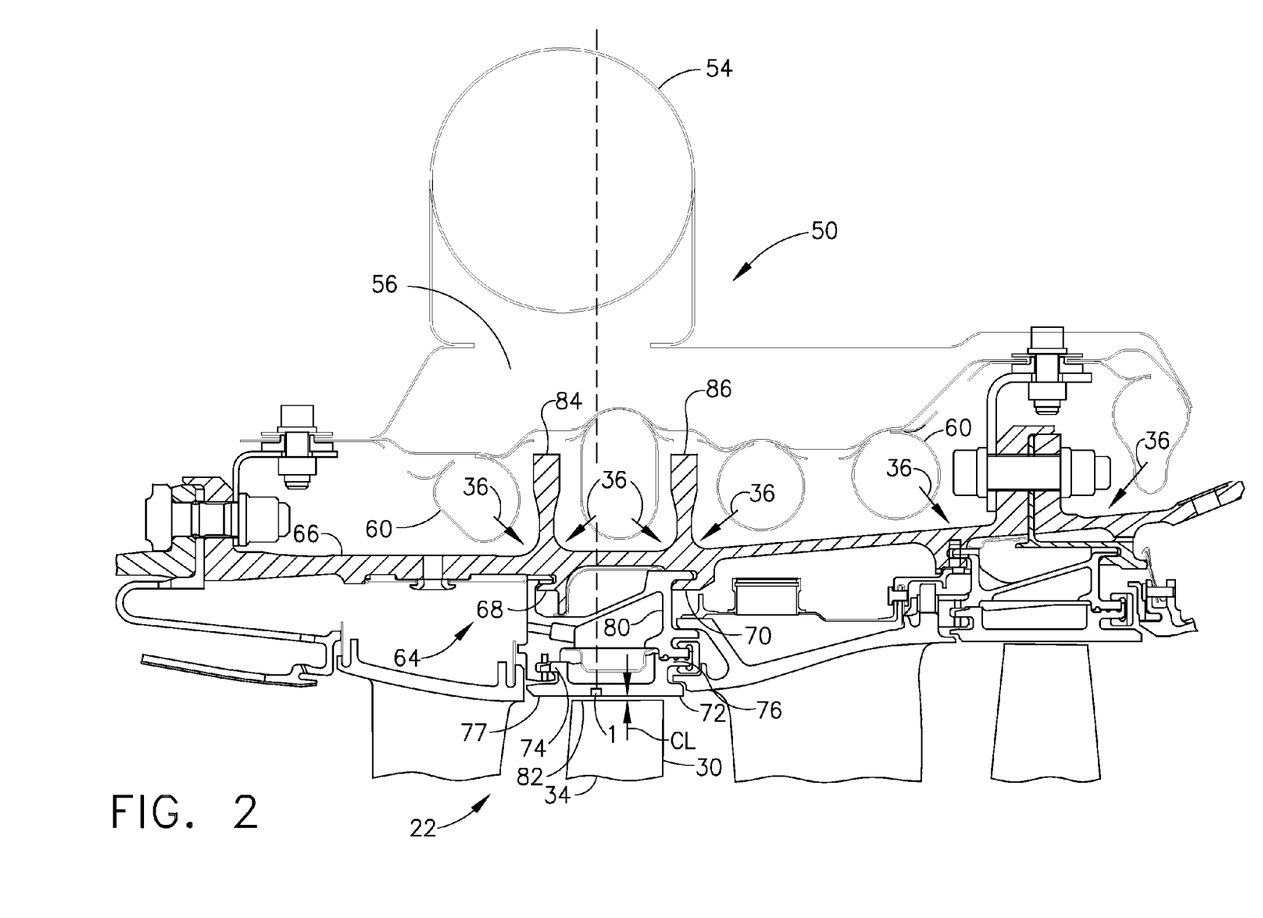
FIG. 2 is an enlarged cross-sectional view illustration of the probe situated to measure turbine rotor blade tip clearance in a high pressure turbine assembly illustrated in FIG. 1.

A compressed fan air supply 32 is used as a source for thermal control air 36 which is supplied to a turbine blade tip clearance control apparatus 40 through an axial air supply tube 42. An air valve 44 disposed in the air supply tube 42 controls the amount of thermal control air flowed therethrough. The thermal control air 36 is cooling air in the exemplary embodiment of the active clearance control system 12 illustrated herein. The cooling air is controllably flowed from a fan bypass duct 15 surrounding the booster or low pressure compressor (LPC) 16 through the axial air supply tube 42 to a distribution manifold 50 of the turbine blade clearance control apparatus 40. The air valve 44 and the amount of thermal control air 36 impinged for controlling turbine blade tip clearances CL, illustrated in FIG. 2, is controlled by the controller 48. The controller 48 is a digital electronic engine control system often referred to as a Full Authority Digital Electronic Control (FADEC) and controls the amount and temperature if so desired of the thermal control air 36 impinged on forward and aft thermal control rings 84, 86 and, thus, to control the turbine blade tip clearance CL.

Figure 3:
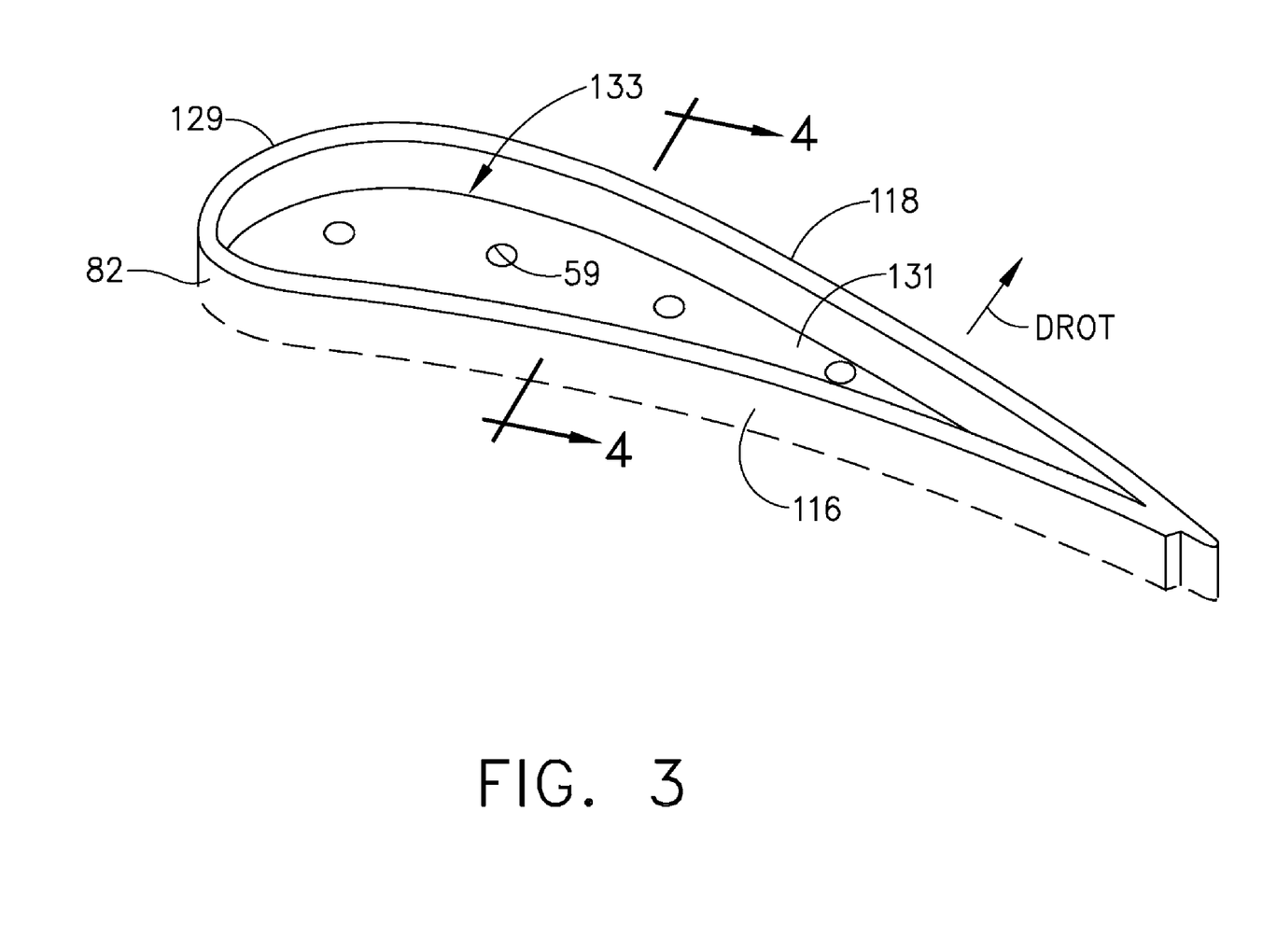
FIG. 3 is a perspective view illustration of a squealer type turbine blade tip of a turbine blade illustrated in FIG. 2.

An air supply inlet 19 to the axial air supply tube 42 is located downstream of exit guide vanes 17 disposed in the fan bypass duct 15 downstream of the fan 14. The distribution manifold 50 encircles a portion of the high pressure turbine 22. The manifold 50 includes an annular supply tube 54 which distributes the cooling air to a plurality of plenums 56 of a plurality of header assemblies 57 from which the cooling air is distributed to a plurality of annular spray tubes 60 circumscribed about the engine axis 8 as illustrated in FIGS. 2 and 3. An algorithm or mathematical computational active clearance control flow model hereinafter referred to as ACC flow model 92 is used to control the turbine blade tip clearance CL and is stored and run in the controller 48.

The ACC flow model 92 is based on engine operating parameters and physical properties of various parts of the engine. The controller 48 sends a valve position signal to the air valve 44 based on the computational ACC flow model 92 to control the total amount of thermal control air 36. The air valve 44 is opened in increments according to the valve position signal. The ACC flow model 92 may be at least partially based on a calculated amount of blade tip deterioration DT (illustrated in FIG. 4). The radial blade tip clearance CL includes an increasing amount of the blade tip deterioration DT as the engine is used over an increasing amount of time and cycles.

In the exemplary embodiment illustrated herein, the ACC flow model 92 includes an added deterioration term to take into account the amount of blade tip deterioration DT as well as a measured real time or instantaneous clearance blade tip clearance CL. This blade tip clearance will be referenced to herein as a measured clearance. A clearance model program CLM to determine the amount of blade tip deterioration DT is run in the FADEC as part of the ACC flow model 92. The clearance model program CLM runs in the background in FADEC after the engine is started.

The clearance model program CLM is also used to determine a synthesized real time or instantaneous blade tip clearance based on a first set of engine operating parameters including physical properties of various parts of the engine. The first set of engine operating parameters typically includes but is not limited to rotor and stator time constants, measured core rotor speed (N2), air flows, temperatures & pressures, time since throttle movement, and altitude. This clearance will be referenced to herein as a synthesized or calculated clearance. A schedule of desired blade tip clearance, referred to herein as demand clearance, is also calculated or determined by the clearance model program CLM based on a second set of engine operating parameters including physical properties of various parts of the engine. The second set of engine operating parameters and/or physical properties typically includes but is not limited to the measured core rotor speed (N2); total air temperature at ambient conditions TAT, and the altitude. This clearance will be referenced to herein as a demand clearance.

Typically in the past, the instantaneous blade tip clearance was used as a current clearance and constantly compared to the demand clearance and the air valve 44 was adjusted in an iterative process until these two clearances essentially matched. A method for operating the active clearance control system 12 disclosed herein uses the measured clearances and, in the more particular method illustrated herein, the method uses the measured clearances together with the calculated clearance and the demand clearance.

Illustrated in FIG. 2 is a first turbine stator assembly 64 attached to a radially outer casing 66 of the HPT 22 by forward and aft case hooks 68 and 70. The stator assembly 64 includes an annular segmented stator shroud 72 having shroud segments 77 mounted by forward and aft shroud hooks 74, 76 to an annular segmented shroud support 80 of the first turbine stator assembly 64. The shroud 72 circumscribes the blade tips 82 of turbine blades 34 of the rotor 30 and helps reduce the flow from leaking around the blade tips 82. The active clearance control system 12 is used to minimize the radial blade tip clearance CL between the blade tip 82 and the shroud 72, particularly during cruise operation of the engine 10. Active clearance control may also be effected by blowing or impinging thermal control air, typically cooling air, on an exterior or interior turbine casing that supports a stator shroud. The active clearance control system 12 incorporates a multiple or multi sensor clearance probe 1 to measure the radial blade tip clearance CL between the blade tip 82 and the shroud 72. The probes 1 illustrated herein are capacitance probes.

Figure 4:
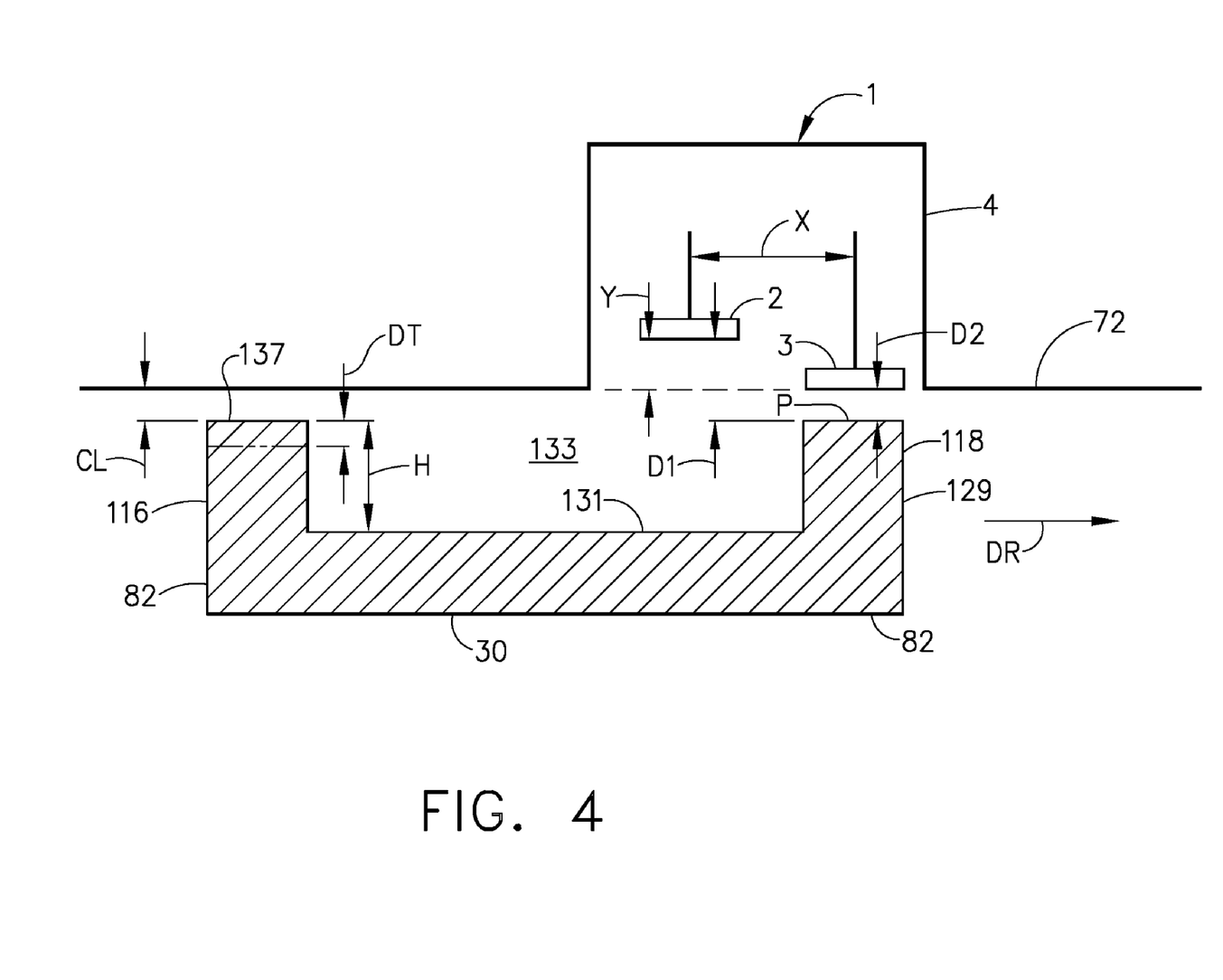
FIG. 4 is a schematical cross-sectional view illustration of the probe illustrated in FIG. 2 and squealer tip illustrated in FIG. 3.

Illustrated in FIGS. 3 and 4 is the blade tip 82 in the form of a squealer tip having a squealer tip wall 129 extending radially outwardly from and peripherally around a radially outwardly facing wall 131 forming a squealer tip cavity 133 therein. The squealer tip wall 129 includes pressure and suction side wall sections 116, 118 which indicate a direction of rotation DROT of the rotor 30. Cooling holes 59 are used to cool the blade tip 82.

Schematically illustrated in cross-section in FIG. 4 is an exemplary embodiment of a multi sensor clearance probe 1 having first and second sensors 2, 3 mounted in a housing 4. The probe 1 is designed to measure first and second radial or longitudinal distances D1, D2 between the first and second sensors 2, 3 respectively and a position on the rotor component, illustrated herein as the blade tip 82 of the turbine blade 34, while the rotor component is rotating. Since the probe 1 is illustrated herein as having two sensors, it may be referred to as a dual sensor clearance probe 1.

The first and second sensors 2, 3 are longitudinally spaced apart a longitudinal offset Y and transversely spaced apart a transverse offset X. Thus, the first and second distances D1 and D2 between the first and second sensors 2 and 3 respectively and a point P on the rotor 30 are always different and should be different by the longitudinal offset Y. The probe 1 is illustrated herein for use in measuring clearances between the blade tip 82 and the stator shroud 72 and, more particularly, between the pressure and suction side wall sections 116, 118 of the squealer tip wall 129. The probe can be constantly calibrated in real time by measuring the first and second distances D1 and D2 of a relatively non-deteriorating part of the rotor such as the radially outwardly facing wall 131 of the blade tip 82. The second sensors 3 illustrated herein are capacitance sensors.

The clearance probe 1 with two or more longitudinally spaced apart or offset sensors to measure clearances enables real-time calibration of the active clearance control system 12 as each blade tip 82 passes by the probe, and also facilitates compensation for temperature effects on the electronics and for installation variability. Direct measurement of clearances using the clearance probe 1 allows detection of blade tip loss DT (from rubs, oxidation, or erosion). This blade tip loss DT, resulting in turbine efficiency deterioration, may be countered or accommodated by further modulating the impingement cooling flow controlled by the active clearance control system, effectively reversing the effect of the turbine efficiency deterioration and increasing efficiency and time-on-wing life of the engine.

Clearances may vary around the casing may change due to differential axisymmetric growth of the rotor and/or stator components, or due to non-axisymmetric deflections or deformations of the casing relative to the rotor. In the latter cases, clearances may actually decrease locally while at the sensor location the clearance is increasing. This introduces the risk that the clearance control system will introduce unstable rubs by driving closure of clearances based on the sensor reading, as the blade tips rub at a different clock position. Measurement of clearance at the blade tip and at another radial location on the blade further from the case can be used to measure a height H of the blade tip as indicated in FIG. 4 and also the amount of blade tip loss DT. The height H is measured from the radially outwardly facing wall 131 of the squealer tip cavity 133. Changes in this measured height will indicate when a rub is occurring and can be used to avoid unstable blade rubs. Using these blade tip clearance data, indicated by blade tip clearance CL measured by the probe in conjunction with bearing proximity probe data, clearance closure due to rotor orbiting or vibration may be evaluated and resulting rubs minimized. Programs in FADEC already look at vibration amplitudes as detected by seismic probes elsewhere in the engine, and uses that data to detect possible problems with engine operation (e.g.: bearing deterioration, blade FOD, etc.).

Figure 5:
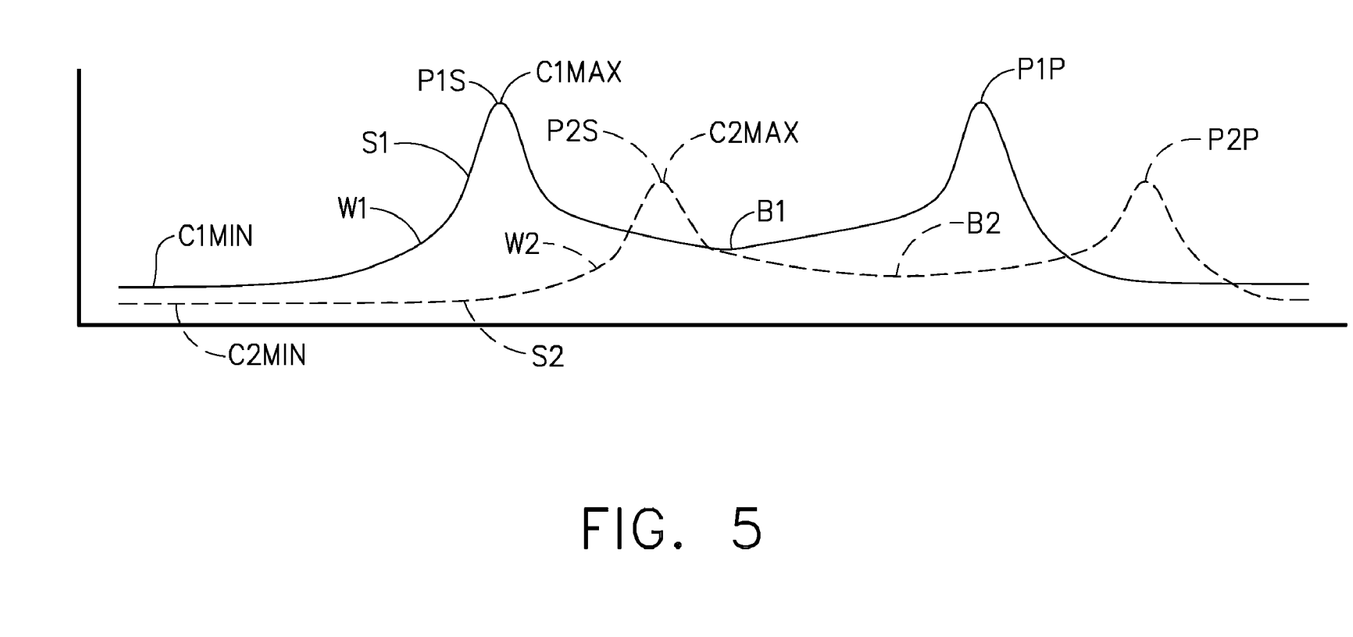
FIG. 5 is a graphical representation of capacitance waveforms of the two sensors as the blade tip illustrated in FIG. 4 passes by the sensors.

Illustrated in FIG. 5 is are exemplary first and second capacitance waveform signals S1, S2 as measured by the first and second sensors 2, 3 of the probe 1. The first and second capacitance waveform signals S1, S2 are characterized by first and second waveforms W1, W2. The first waveform W1 has first suction and pressure side peaks P1S, P1P with a first trough having a first trough bottom B1 therebetween. The second waveform W2 has second suction and pressure side peaks P2S, P2P with a second trough having a second trough bottom B2 therebetween.

The first and second maximum signal readings C1MAX and C2MAX are readings of the suction side wall section 118 of the squealer tip wall 129 as it rotates past the first and second sensors 2, 3 of the probe 1. The first and second capacitance waveform signals S1, S2 are further characterized by a first waveform having a first minimum signal reading C1MIN followed by a first maximum signal reading C1MAX and a second waveform having a second minimum signal reading C2MIN followed by a second maximum signal reading C2MAX respectively. A distance, D in the formula below (illustrated as first and second distances D1 and D2 in FIG. 4), between the shroud or the probe 1 and any feature on the rotor can be calculated using a formula similar to:

$$D=K\times f((C1(\text{feature})-C1\text{MIN})/(C2(\text{feature})-C2\text{MIN}))$$

C1(feature) is a signal reading associated with a feature on the rotor. Referring further to FIG. 4, rotor features illustrated herein include the suction side wall section 118 of the squealer tip wall 129. The C1MAX, C2MAX are associated with the suction side wall section 118 as it rotates past the first and second sensors 2, 3 of the probe 1. The C1MIN, C2MIN are associated with the blade platforms 39.

Other associated readings are for the first and second trough bottom B1, B2. Thus, using the formula for the distance D, distances for the radial blade tip clearance CL between the blade tip 82 and the shroud 72 and a blade tip height H can be calculated for each blade and, thus, blade tip loss DT for each revolution of the rotor. The blade tip height H is a radial distance from the radially outwardly facing wall 131 to a top 137 of the squealer tip wall 129. The blade tip height H is subject to deterioration which reduces an original height by an amount equal to the blade tip loss DT.

The use of multiple sensors, two being illustrated herein, in the probe allows real-time calibration of the system as each blade tip passes by the probe, and also facilitates compensation for temperature effects on the electronics and for installation variability. Direct measurement of clearances allows detection of blade tip loss (from rubs, oxidation, or erosion). This tip loss, resulting in turbine efficiency deterioration, may be accommodated by further modulating the impingement or cooling flow as represented herein by the amount of thermal control air 36, effectively counteracting the deterioration and increasing efficiency and time-on-wing life.

Figure 6:
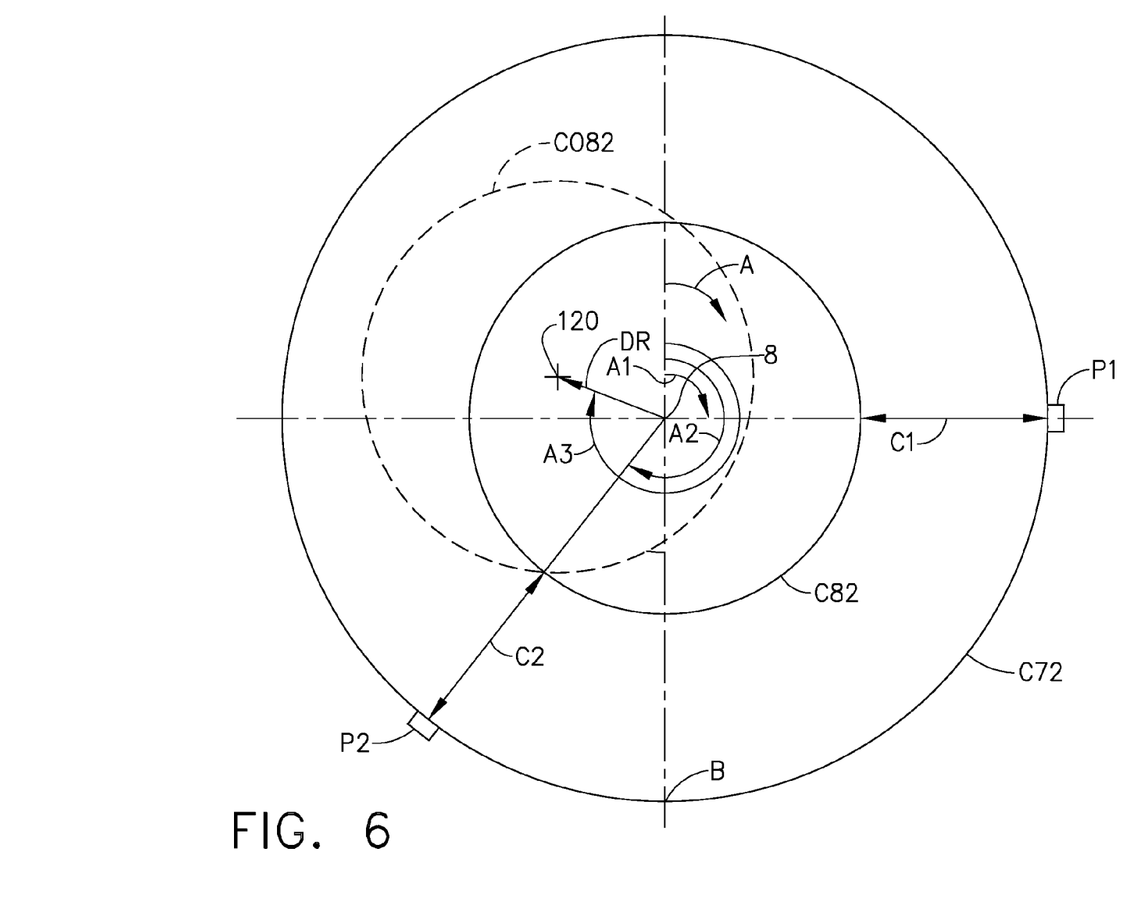
FIG. 6 is a diagrammatical representation of a method using two of the probes to determine rotor centerline offset.

As illustrated in FIG. 6, the engine is circumferentially centered about the engine axis 8 which is also the design centerline of the stator or shroud 72 as represented by a shroud circumference C72 of the shroud 72 and of the rotor as represented by a blade tip circumference C82. The blade tip circumference C82 is delineated by a revolution of a single one of the blade tips 82 of the turbine blades 34. The rotor may become offset resulting in a rotor centerline offset 120. A blade tip offset circumference C082 is illustrated for the rotor centerline offset 120. The rotor centerline offset 120 is defined herein in polar coordinates, as measured from the design centerline or engine axis 8, as a change in radius DR at an angular offset angle A3 as measured by a clock position A in degrees or radians from 0 degrees of the casing at the top of the stator or shroud 72 as represented by the shroud circumference C72.

When the rotor is offset, the blade tip clearances CL at specific clock positions around the case may change due to differential axisymmetric growth of the rotor and stator components or axisymmetric deflections or deformations of the case relative to the rotor. In this latter instance, clearances may actually decrease locally while at a clearance probe location, the clearance is indicated as increasing. This introduces the risk that the clearance control system will introduce unstable rubs by driving closure of clearances based on a single probe located at a single position, as the blade tips rub at a different clock position.

The change in radius DR and the angular offset angle A3 may be calculated by using two or more of the clearance probes described above. The method illustrated herein uses angularly spaced apart first and second multi sensor clearance probes P1, P2 respectively as illustrated in FIG. 6. The probes can be spaced apart 90 degrees or more but not 180 degrees, because then they would be opposite each other. The probes illustrated herein are spaced apart 135 degrees. If one probe is placed at a bottom B of the engine or shroud, corresponding to A=180 degrees, the water accumulating at the bottom of the shroud or stator can damage the probes.

Using the methods described above first and second blade tip clearances C1, C2 can be measured for a single blade by the first and second clearance probes P1, P2 respectively at first and second clock positions A1, A2 respectively around the casing. A nominal clearance CNOM is set to an average of the first and second blade tip clearances C1, C2. Using the following two equations, the change in radius DR and the angular offset angle A3 can be calculated.

$$C1 = CNOM - (DR*\cos(A3-A1))$$

$$C2 = CNOM - (DR*\cos(A3-A2))$$

Since there are two equations and two unknowns, DR and A3, the change in radius DR and the angular offset angle A3 can be determined.

Measurement of clearance at the blade tip and at another location on the blade further from the case can be used to measure the height of the blade tip as explained above. Changes in this measured height indicates when a rub is occurring and can be used to avoid unstable blade rubs. By using these clearance data in conjunction with bearing proximity probe data, clearance closure due to rotor orbiting or vibration may also be evaluated and resulting rubs minimized.

During engine operation, an algorithm or mathematical computational active clearance control flow model hereinafter referred to as ACC flow model 92 is used to control the turbine blade tip clearance CL. The ACC flow model 92 is stored and run in the controller 48. The ACC flow model 92 is based on engine operating parameters and physical properties of various parts of the engine. The controller 48 sends a valve position signal to the air valve 44 based on the computational ACC flow model 92 to control the total amount of thermal control air 36. The air valve 44 is opened in increments according to the valve position signal. The ACC flow model 92 is at least partially based on a calculated amount of blade tip deterioration DT. The radial blade tip clearance CL includes an increasing amount of the blade tip deterioration DT as the engine is used over an increasing amount of time and cycles. In the exemplary embodiment illustrated herein, the ACC flow model 92 includes an added deterioration term to take into account the amount of blade tip clearance deterioration DT. A clearance model program CLM to determine the amount of blade tip deterioration DT is run in the FADEC as part of the ACC flow model 92. The clearance model program CLM runs in background in FADEC after the engine is started.

Figure 7A:
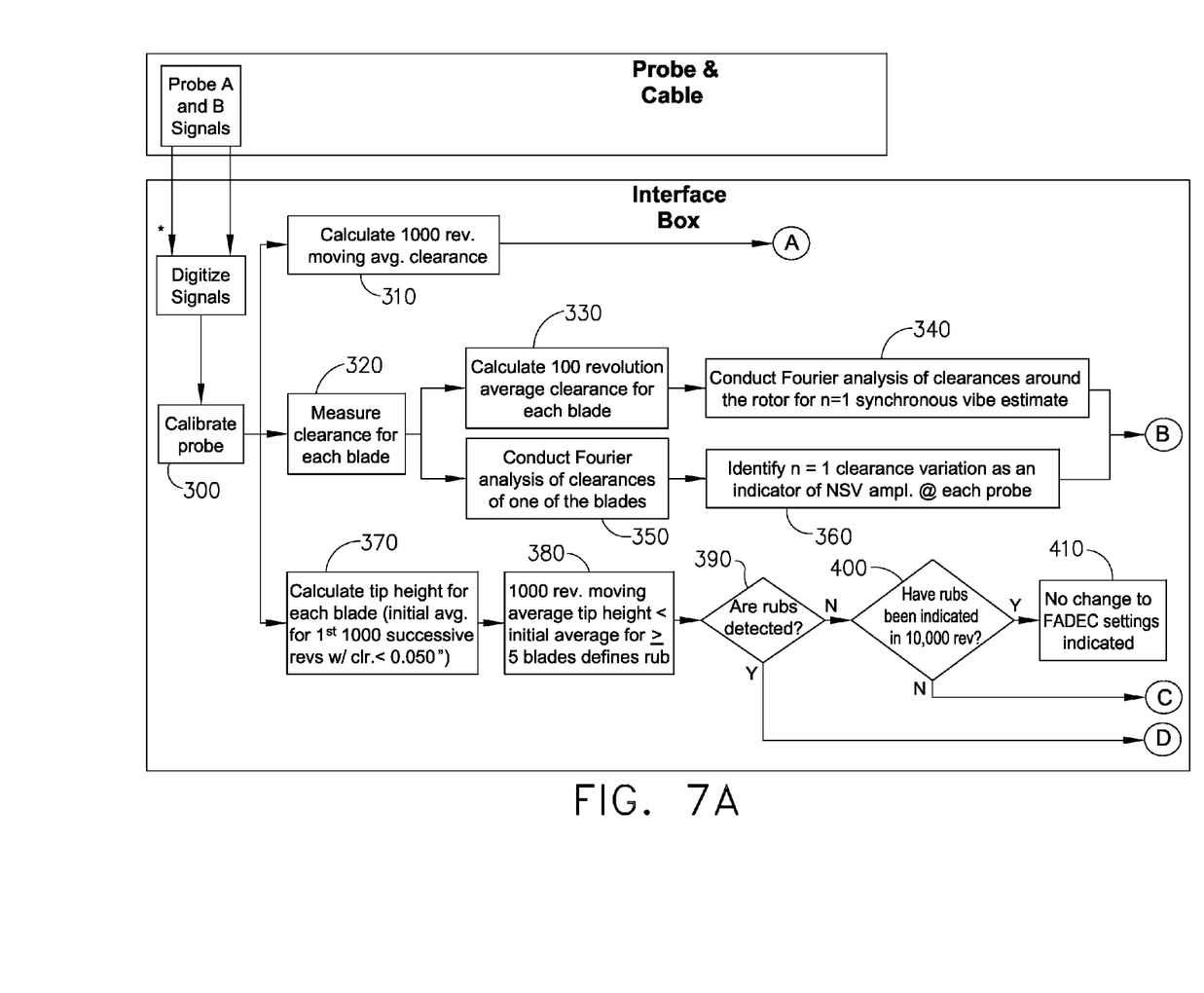
FIGS. 7A-7C is a flow chart illustrating an exemplary logic for using the probe to determine blade tip clearance for active clearance control.
Figure 7B:
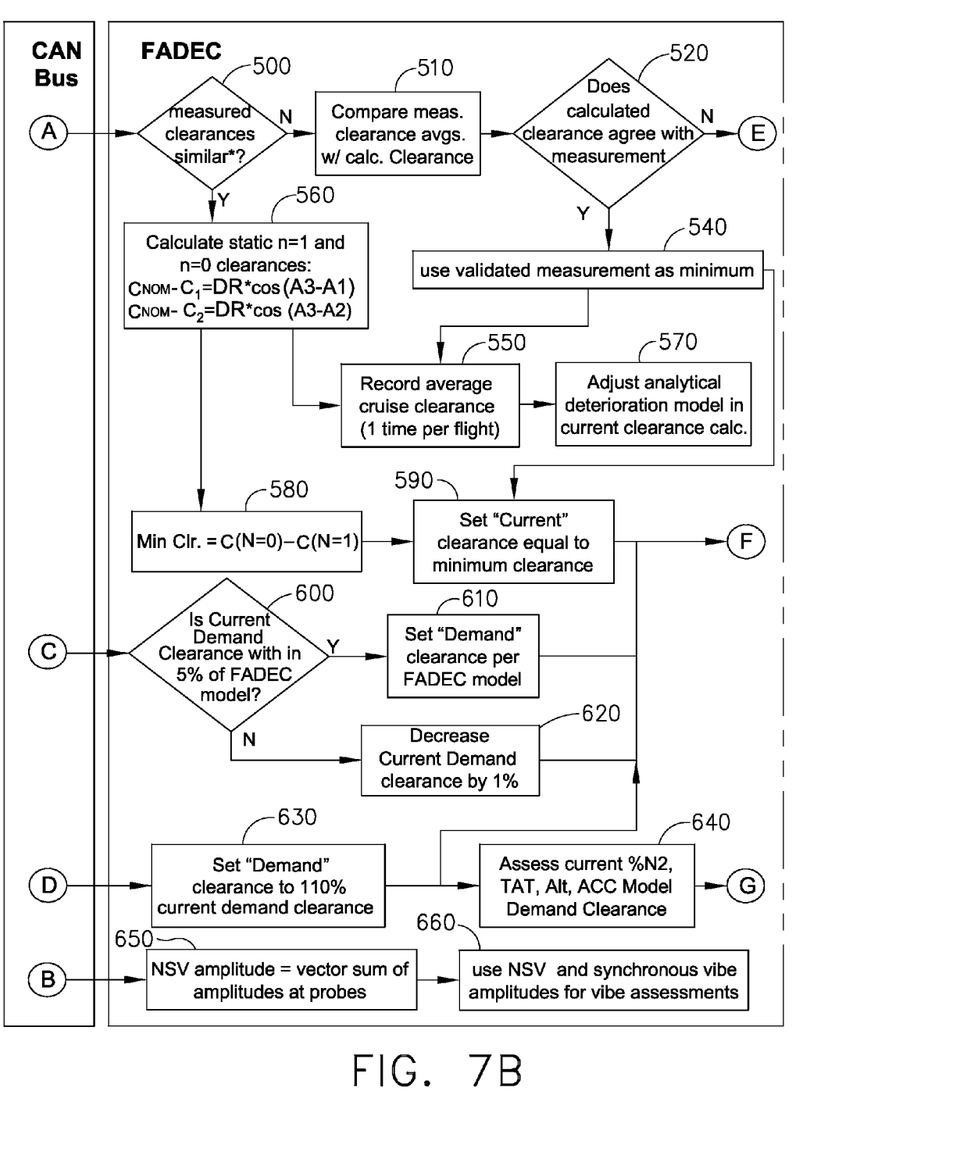
Figure 7C:
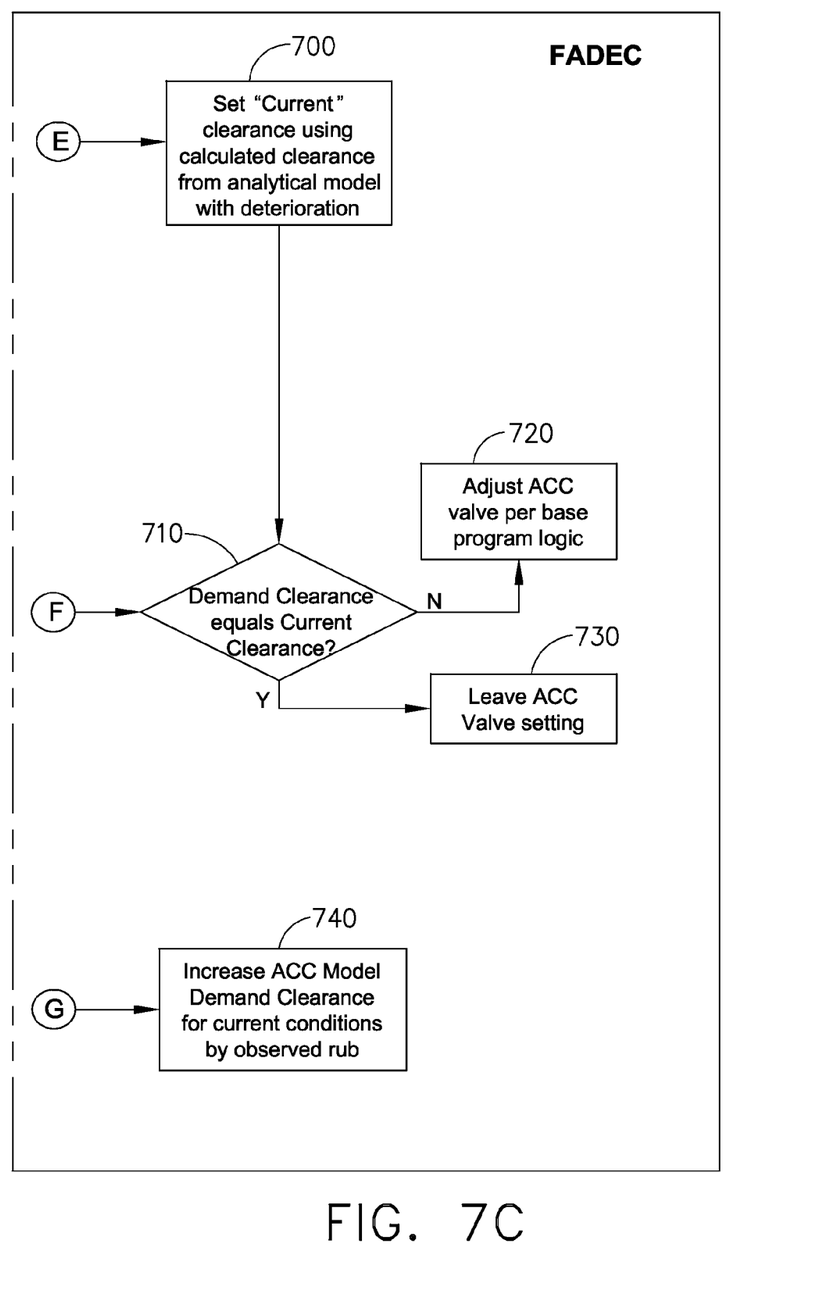

A flow chart illustrated in FIGS. 7A through 7C outlines exemplary logic for calculating and sending the valve position signal to control the air valve 44 for active clearance control. Signals from the first and second sensors 2, 3 of each of the first and second clearance probes P1, P2 (more if more than two probes are used) are sent from the probes to an interface box which serves as a signal processor 52 (as illustrated in FIG. 1) where they are digitized and the probes calibrated, in the manner described above, as indicated in block 300 in FIG. 7A. The distance D between the shroud or the probe 1 and the blade tip of each blade is computed to get the clearance CL and blade height H for each blade for each revolution of the engine using a formula similar to:

$$D = K \times f((C1(\text{blade tip or wall } 131) - C1\text{MIN})/(C2 (\text{blade tip or wall } 131) - C2\text{MIN}))$$

The height H is measured from the radially outwardly facing wall 131 of the squealer tip cavity 133. A 1000 revolution moving average of the clearance is calculated for one blade in block 310 and sent to box A.

The logic further includes measuring the clearance for each blade in block 320 and then calculating a 100 revolution moving average for each blade in block 330 and conducting a Fourier analysis of 100 revolution moving average of measured clearances around the rotor for a n=1 synchronous vibe estimate in block 340. Synchronous vibrations are vibrations with frequency equal to the rotor speed, e.g.: at 6000 rpm, a synchronous vibration will have a frequency of (6000 rev/min)/(60 sec/min)=100 cycles/sec=100 Hz. The measured clearances between the probe and the blades should be essentially constant for all the blades. A fourier analysis conducted of a distribution of the measured clearances for all the blades is examined for a 1/rev component which is an estimate of the synchronous vibration amplitude.

From the measured clearances a Fourier analysis is conducted of a measured clearance of one of the blades in block 350. A n=1 clearance variation around the rotor is identified at each probe in block 360 and serves as an indicator of NSV (Non-Synchronous Vibration) amplitude at each of the probes. The results from blocks 340 and 360 are sent to box B. NSV amplitude is a vector sum of amplitudes at the probes. NSV is a non synchronous vibration (i.e.: vibrations that may not relate directly to rotor speed).

Using the data from block 300, a blade tip height H, based on measured data from the probes, is calculated for each blade in block 370. An initial base or initial average blade tip height H for each blade is calculated using an average of a first 1000 successive revolutions of the engine with a tip clearance less than a base clearance which is illustrated herein as 0.050 inches or 50 mils. A 1000 revolution moving average of the blade tip height H is calculated for each blade in block 380 and compared to the base or initial average calculated in box 370. A moving average of the blade tip height H less than the initial average for a rub indicating threshold number of blades, illustrated herein as 5 or more blades, defines or indicates a rub condition.

If rubs are detected in block 390 the program proceeds to block D and if rubs are not detected in block 390 the program proceeds to block 400. Block 400 determines if rubs have been detected over a moving period of 10,000 revolutions and if not the program proceeds to block C. If block 400 determines that rubs have been detected over the moving period of 10,000 revolutions it draws the conclusion illustrated in block 410 that no change to active clearance controls in the FADEC are indicated. This means that the controller 48 does not have to send a change valve position signal to the air valve 44 either increasing or decreasing the total amount of thermal control air 36.

FIG. 7B illustrates the portion of the logic performed in the controller 48 or the FADEC as illustrated herein. Data from the interface box is sent to the FADEC by a CAN bus (Controller Area Network bus). Proceeding from block A, the measured clearances from the two 2-sensor probes are compared for similarity to each other in box 500. If the measured clearances are determined to be similar, the program proceeds to box 560 in which static n=1 and n=0 clearances are calculated. The n=1 and n=0 clearances are calculated assuming the centerlines of the rotor and of the stator were coincident and assuming that the rotor centerline is offset from the stator centerline respectively. As described above using the two equations below, the two unknowns, DR and A3, the change in radius DR and the angular offset angle A3 can be determined for two probes.

$$CNOM-C1=(DR*\cos(A3-A1))$$

$$CNOM-C2=(DR*\cos(A3-A2))$$

If more probes are used other statistical methods (i.e. least square fit) may be used.

Using these clearances and offsets static n=1 and n=0 clearances are calculated in box 560. N=0 clearances C(n=0) are the clearances that would be measured if the centerline of the rotor and of the stator were coincident (the clearances would then be constant around the circumference). N=1 clearances C(n=1) are the clearances variations around the circumference assuming that the rotor centerline is offset from the stator centerline by DR and A3 above. A minimum clearance is calculated in box 580 which illustrates that the minimum clearance Min Clr.=C(n=0)−C(n=1).

If, in box 500, the measured clearances are determined not to be similar the program proceeds to box 510 in which the average measured clearance from each of the 2-sensor probes is compared to calculated clearances from the ACC analytical flow model 92 running in FADEC. Block 520 inquires whether the calculated clearances from the ACC flow model 92 agrees with the average of the measured clearances from one of the probes in block 510 and if it doesn't this branch of the program proceeds to block E and if it does then the program proceeds to block 540. If the inquiry in block 520 determines that the ACC flow model agrees with the average of the measured clearances from block 510 then the program continues using that validated blade tip clearance measured by the probe as a minimum and forwards the validated blade tip measured clearances to block 590 and to block 550.

Data from blocks 540 or 560 are used to calculate and record an average cruise clearance from measured clearances, once per flight or cycle, in block 550. In block 570 the average cruise clearance is used to adjust the analytical deterioration model used to calculate the amount of blade tip deterioration DT used in the ACC flow model 92 which is used for determining the current clearance calculation. Box 590 sets the current clearance using the minimum clearance calculated in box 580 or the validated blade tip clearances as a minimum from block 540 then sends it on to box F. The current clearance is the clearance used in determining adjustments to the air valve 44.

If no rubs were detected over a moving period of 10,000 revolutions in block 400 and the program proceeded to block C then block 600 determines if the current demand clearance is within a predetermined percentage, illustrated as 5%, of a calculated demand clearance which is calculated in the ACC flow model 92 running in FADEC. If the current demand clearance is within the predetermined percentage, then the current demand clearance is set to the calculated demand clearance calculated in the ACC flow model 92 as illustrated in block 610. If the current demand clearance is not within the predetermined percentage, then the current demand clearance is decreased by a predetermined demand decrease percentage, illustrated herein as 1%, as illustrated in block 620.

If rubs are detected in block 390 and the program has proceeded to block D then demand clearance is set to a predetermined demand increase percentage, illustrated herein as 110% of the current demand clearance as illustrated in block 630. The demand clearance from blocks 610, 620, or 630 along with current clearance from block 590 are sent to block F. After the demand clearance has been set to 110% of the current demand clearance in block 630 the program assess current values of high pressure rotor speed (N2), total air temperature at ambient conditions (TAT), altitude (Alt), and the ACC model demand clearance from the ACC flow model 92 running in FADEC in block 640 and then proceeds to block G. Proceeding from block B a NSV amplitude (a vector sum of amplitudes at the probes) is calculated for both probes as illustrated in block 650. Then the NSV and synchronous vibe amplitudes are used to assess vibrations as illustrated in block 660.

FIG. 7C illustrates a remaining portion of the logic performed in the controller 48 or the FADEC as illustrated herein. Proceeding from block E, if in block 520 the ACC flow model does not agree with the averages of the measured clearances from either of the 2-sensor probes in block 510 then in block 700 the program sets the current clearance to the calculated clearance from the analytical ACC flow model 92 with the blade tip deterioration DT. Proceeding from block F and block 700 the logic determines if the demand clearance equals the current clearance in block 710. If the demand clearance equals the current clearance in block 710 then the logic proceeds to block 730 and doesn't change the air valve 44 setting. If the demand clearance does not equal the current clearance in block 710 then the logic proceeds to block 720 and adjusts the air valve 44 setting according to base program logic. The logic program, having determined that there are rubs, proceeds from block G to block 740 in which the ACC model demand clearance is increased for those current conditions to prevent future rubs. The logic process described above runs constantly in FADEC while the engine is running.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. An apparatus comprising:
   at least one multi sensor clearance probe,
   at least first and second sensors in the clearance probe,
   the first and second sensors being longitudinally and transversely spaced apart, and
   the first and second sensors being operable to measure first and second distances respectively between the sensors and a rotating rotor longitudinally spaced apart from the sensors.

2. An apparatus as claimed in claim 1 further comprising the clearance probe having a housing containing the first and second sensors.

3. An apparatus as claimed in claim 1 further comprising:
   turbine blades mounted at a periphery of the rotor,
   radially outer blade tips of the blades,
   an annular stator shroud circumscribing the blade tips, and
   the first and second sensors being operable to measure the first and second distances respectively between the sensors and the blade tips.

4. An apparatus as claimed in claim 3 further comprising:
   the blade tip being a squealer tip having a squealer tip wall extending radially outwardly from and peripherally around a radially outwardly facing wall forming a squealer tip cavity therein, and
   the first and second sensors being further operable to measure the first and second distances respectively between the sensors and a top of the squealer tip wall of the radially outer blade tips.

5. An apparatus as claimed in claim 4 further comprising the first and second sensors being further operable to measure the first and second distances respectively between the sensors and the radially outwardly facing wall.

6. An apparatus as claimed in claim 3 further comprising:
   an air valve to control thermal control air used to adjust clearance between the blade tip and the stator shroud,
   the first and second sensors operably connected to a controller for sending signals to the controller indicating the first and second distances, and
   the controller operably connected to the air valve to modulate and open and close the air valve.

7. An apparatus as claimed in claim 6 further comprising:
   the blade tip being a squealer tip having a squealer tip wall extending radially outwardly from and peripherally around a radially outwardly facing wall forming a squealer tip cavity therein, and
   the first and second sensors being operable to measure the first and second distances respectively between the sensors and a top of the squealer tip wall of the radially outer blade tips.

8. An apparatus as claimed in claim 7 further comprising the first and second sensors being operable to measure the first and second distances respectively between the sensors and the radially outwardly facing wall.

9. An apparatus comprising:
   at least first and second angularly spaced apart multi sensor clearance probes,
   at least first and second sensors in each of the clearance probes,
   the first and second sensors being longitudinally and transversely spaced apart,
   the first and second sensors being operable to measure first and second distances respectively between the sensors and a rotating rotor longitudinally spaced apart from the sensors,
   turbine blades mounted at a periphery of the rotor,
   radially outer blade tips of the blades,
   an annular stator shroud circumscribing the blade tips, and
   the first and second sensors being operable to measure the first and second distances between the sensors and the blade tips.

10. An apparatus as claimed in claim 9 further comprising:
    the blade tip being a squealer tip having a squealer tip wall extending radially outwardly from and peripherally around a radially outwardly facing wall forming a squealer tip cavity therein, and
    the first and second sensors being further operable to measure the first and second distances respectively between the sensors and a top of the squealer tip wall of the radially outer blade tips.

11. An apparatus as claimed in claim 10 further comprising the first and second sensors being further operable to measure the first and second distances respectively between the sensors and the radially outwardly facing wall.

12. An apparatus as claimed in claim 9 further comprising:
    an air valve to control thermal control air used to adjust clearance between the blade tip and the stator shroud,
    the first and second sensors operably connected to a controller for sending signals to the controller indicating the first and second distances, and
    the controller operably connected to the air valve to modulate and open and close the air valve.

13. An apparatus as claimed in claim 12 further comprising:
    the blade tip being a squealer tip having a squealer tip wall extending radially outwardly from and peripherally around a radially outwardly facing wall forming a squealer tip cavity therein, and
    the first and second sensors being operable to measure the first and second distances respectively between the sensors and a top of the squealer tip wall of the radially outer blade tips.

14. An apparatus as claimed in claim 13 further comprising the first and second sensors being operable to measure the first and second distances respectively between the sensors and the radially outwardly facing wall.

15. An apparatus as claimed in claim 9 further comprising the first and second angularly spaced apart multi sensor clearance probes angularly spaced apart 90 degrees or more but not 180 degrees.

16. An apparatus as claimed in claim 15 further comprising neither of the first and second angularly spaced apart multi sensor clearance probes be located at a bottom of the shroud.

17. A method comprising determining clearance between a rotating rotor and a stator circumscribing the rotor using at least one multi sensor clearance probe having at least longitudinally and transversely spaced apart first and second sensors to measure at least first and second distances respectively between the first and second sensors and a rotating rotor.

18. A method as claimed in claim 17 further comprising the measuring including measuring the first and second distances between the sensors and radially outer blade tips of turbine blades mounted at a periphery of the rotor.

19. A method as claimed in claim 18 further comprising determining changes in height of the blade tips at least partially based on the first and second distances.

20. A method as claimed in claim 19 further comprising determining rubbing from the determination of changes in the height of the blade tips.

21. A method as claimed in claim 19 further comprising adjusting thermal control air at least partially based on the first and second distances and using the thermal control air in an active clearance control system for controlling turbine blade tip clearances between the blade tips and an annular stator shroud circumscribing the blade tips of the turbine blades.

22. A method as claimed in claim 21 further comprising the adjusting thermal control air further based on a desired blade tip clearance and comparing a measured tip clearance at least partially based on the first and second distances to the desired blade tip clearance.

23. A method as claimed in claim 22 further comprising the adjusting thermal control air further based on a calculated instantaneous blade tip clearance and comparing the measured tip clearance and/or the calculated instantaneous blade tip clearance to the desired blade tip clearance.

24. A method as claimed in claim 22 further comprising basing the calculated instantaneous blade tip clearance on a first set of engine operating parameters and basing the desired blade tip clearance on a second set of engine operating parameters.

25. A method as claimed in claim 24 further comprising the first set of engine operating parameters chosen from a first group including rotor and stator time constants, measured core rotor speed, air flows, temperatures and pressures, time since throttle movement, and altitude and the second set of engine operating parameters chosen from a second group including measured core rotor speed, total air temperature at ambient conditions, and the altitude.

26. A method as claimed in claim 19 further comprising determining a rotor centerline offset based on the at least first and second distances.

27. A method as claimed in claim 19 further comprising the measuring further including measuring the first and second distances between the sensors and the radially outwardly facing wall.

28. A method as claimed in claim 27 further comprising determining changes in height of the blade tips at least partially based on the first and second distances.

29. A method as claimed in claim 28 further comprising determining rubbing from the determination of changes in height of the blade tips.

30. A method as claimed in claim 28 further comprising adjusting thermal control air at least partially based on the first and second distances and using the thermal control air in an active clearance control system for controlling turbine blade tip clearances between the blade tips and an annular stator shroud circumscribing the blade tips of the turbine blades.

31. A method as claimed in claim 30 further comprising the adjusting thermal control air further based on a desired blade tip clearance and comparing a measured tip clearance at least partially based on the first and second distances to the desired blade tip clearance.

32. A method as claimed in claim 31 further comprising the adjusting thermal control air further based on a calculated instantaneous blade tip clearance and comparing the measured tip clearance and/or the calculated instantaneous blade tip clearance to the desired blade tip clearance.

33. A method as claimed in claim 32 further comprising basing the calculated instantaneous blade tip clearance on a first set of engine operating parameters and basing the desired blade tip clearance on a second set of engine operating parameters.

34. A method as claimed in claim 33 further comprising the first set of engine operating parameters chosen from a first group including rotor and stator time constants, measured core rotor speed, air flows, temperatures and pressures, time since throttle movement, and altitude and the second set of engine operating parameters chosen from a second group including measured core rotor speed, total air temperature at ambient conditions, and the altitude.

35. A method as claimed in claim 28 further comprising determining a rotor centerline offset based on the at least first and second distances.

36. A method as claimed in claim 18 further comprising the blade tips being squealer tips having squealer tip walls extending radially outwardly from and peripherally around radially outwardly facing walls forming squealer tip cavities therein and the measuring including measuring the first and second distances between the sensors and tops of the squealer tip walls.

* * * * *